United States Patent [19]

Hooper et al.

[11] 4,205,828
[45] Jun. 3, 1980

[54] CUTTING OF CONTOUR BEVELS

[75] Inventors: Harry Hooper, Brewster, Mass.; Fred Balfanz, Waukesha, Wis.

[73] Assignee: C-R-O, Inc., Menomonee Falls, Wis.

[21] Appl. No.: 937,067

[22] Filed: Aug. 28, 1978

[51] Int. Cl.² ............................................. B23K 7/10
[52] U.S. Cl. ...................................... 266/77; 266/63
[58] Field of Search ................... 148/9.6; 219/152 R; 266/58, 64, 63, 73, 74, 77

[56] References Cited

U.S. PATENT DOCUMENTS

| | | | |
|---|---|---|---|
| 1,554,406 | 9/1925 | Coberly | 266/77 |
| 3,765,661 | 10/1973 | Omura | 266/77 |
| 4,006,890 | 2/1976 | Vainer et al. | 266/77 |

FOREIGN PATENT DOCUMENTS

| | | | |
|---|---|---|---|
| 2631995 | 1/1978 | Fed. Rep. of Germany | 266/77 |
| 46-10937 | 3/1971 | Japan | 266/77 |
| 51-2423 | 1/1976 | Japan | 266/77 |

*Primary Examiner*—Paul A. Bell
*Attorney, Agent, or Firm*—Andrus, Sceales, Starke & Sawall

[57] ABSTRACT

The torch of a machine for progressive contour bevel cutting of flat plates is mounted for controlled positioning and movement on an arcuate sector, the radius of which has a center lying in the horizontal plane of the plate. The torch is mounted for movement between adjustable stops which delineate two torch angles for cutting. A device is provided for substantially instantaneously moving the torch along the sector from adjacent one stop to the other stop. In the embodiment disclosed herein, the said device comprises a fluid-operated piston connected to the torch.

7 Claims, 10 Drawing Figures

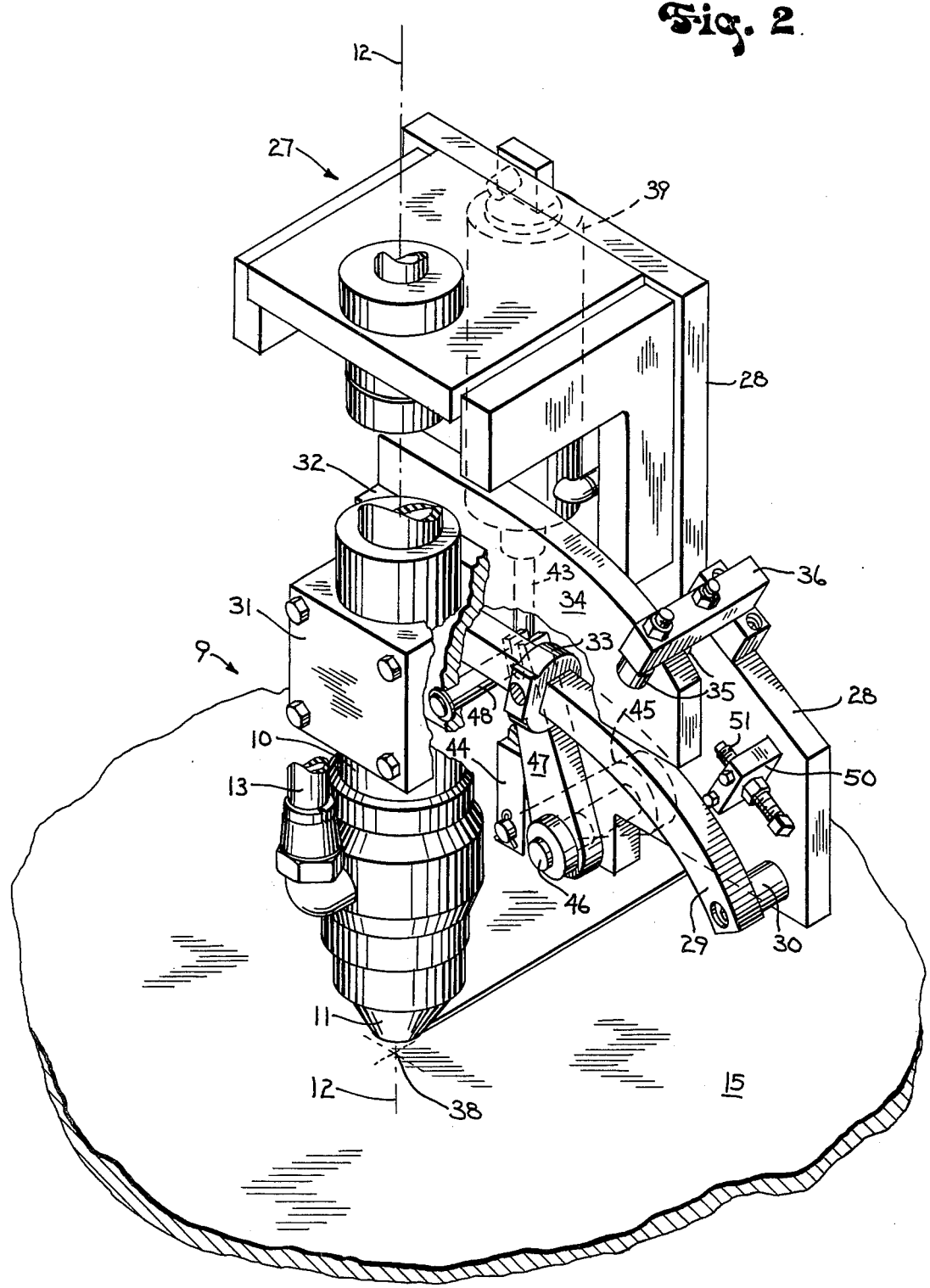

CUTTING OF CONTOUR BEVELS

U.S. PRIOR ART OF INTEREST

| McKiernan | 2,416,399 | February 25, 1947 |
|---|---|---|
| Usami et al | 3,492,552 | January 27, 1970 |
| Omura | 3,765,661 | October 16, 1973 |
| Muller et al | 3,900,346 | August 19, 1975 |
| Cecil | 4,008,384 | February 15, 1977 |

BACKGROUND AND SUMMARY OF THE INVENTION

This invention relates to cutting of contour bevels, and more particularly to the cutting of such bevels on workpieces such as flat metal plates.

Heretofore, in the manufacture of gate valves and the like, the plates from which the valves have been cut have often been fabricated from stainless steel. In contour cutting the valve with the older conventional torches and/or mechanical cutters, a substantial length of cutting time such as 1-2 hours was required. Changes in the contour during cutting could easily be handled because the torch head or other cutter moved slowly relative to the work. In recent times the development of plasma torches, which are electrical in nature, has substantially shortened the cutting time to as little as 1-2 minutes for a similar item, with a major speed increase in torch movement.

With very fast cutting speeds, control of the torch position relative to the flat workpiece during contour bevel cutting has become extremely important. It has already been proposed to mount the plasma torch for movement on an arcuate sector having its center of radius lying in the horizontal plane of the flat workpiece. The torch axis would therefor always pass through the said center of radius, no matter what adjusted angle the torch assumed on the sector during contour bevel cutting. In other words, the torch was always precisely aimed at the surface of the flat workpiece.

In the formation of certain shapes from flat plates, such as the above-mentioned gate valves, it is necessary to provide a vertical edge which merges by a very sharp shoulder into a contoured bevel edge and back again. Heretofore, the control of movement of a plasma torch mounted on a sector during cutting has been so slow that sharp changes in the bevel contour, such as shoulders, have not been possible with this system. Thus, the advantages of the sector concept with plasma torch cutting could not be utilized in the manufacture of these shapes.

The present invention is directed to a concept whereby a sector mounted torch may be controlled in such a manner that substantially instantaneous repositioning of the torch and its resultant angle relative to the workpiece are possible.

More specifically, the torch of a machine for progressive contour bevel cutting of flat plates is mounted for controlled positioning and movement on an arcuate sector, the radius of which has a center lying in the horizontal plane of the plate. The torch is mounted for movement between adjustable stops which delineate two torch angles for cutting. A device is provided for substantially instantaneously moving the torch along the sector from adjacent one stop to the other stop. In the embodiment disclosed herein, the said device comprises a fluid-operated piston connected to the torch.

BRIEF DESCRIPTION OF THE DRAWINGS

The drawings furnished herewith illustrate the best mode presently contemplated by the inventors for carrying out the invention.

In the drawings:

FIG. 2 is an enlarged perspective view of the lower torch mounting assembly with parts broken away;

DESCRIPTION OF THE PREFERRED EMBODIMENT

Figure 1:
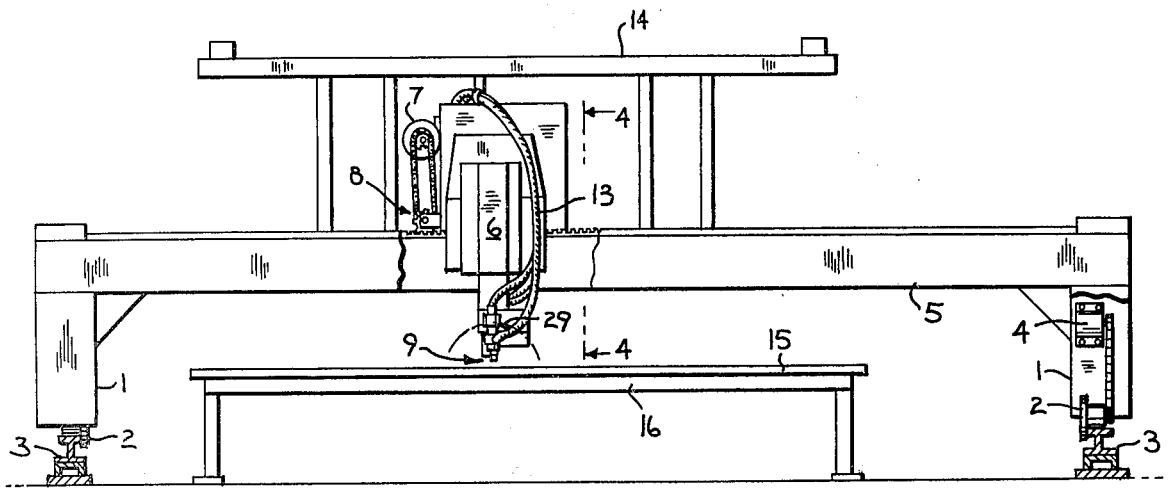
FIG. 1 is a front elevation of a metal cutting machine embodying the concept of the invention, with parts broken away and in section.

As best shown in FIG. 1 of the drawings, a metal cutting machine includes a pair of end trucks 1 having rollers 2 thereon and which are adapted to be driven along floor rails 3 by any suitable well-known servo drive or the like, including one or more motors 4. For this type of machine, the movement along rails 3 during cutting is usually referred to as being in a longitudinal direction.

An elongated box-like bridge 5 is secured to and extends transversely between trucks 1 in a direction normal to rails 3. Bridge 5 is adapted to support at least one torch carriage 6 thereon, with the latter being translatable along the bridge in a transverse direction by drive means such as a motor 7 and rack and pinion 8. Carriage 6 carries a torch assembly 9 which includes a torch body 10 and nozzle 11 forming a torch axis 12.

Torch assembly 9 is serviced and controlled through a plurality of cables 13 in a well-known manner. As shown in FIG. 1, cables 13 extend rearwardly to a festoon system including an overhead track 14.

It is comtemplated that the torch is of the plasma type which promotes fast cutting although other types of torches may also be utilized. Furthermore, while only one carriage 6 and torch assembly 9 are shown, a plurality of such elements will probably be mounted on bridge 5 so that simultaneous multiple cuts may be made.

Torch assembly 9 is adapted to contour cut a flat horizontal workpiece which is shown as a metal plate 15 fixedly supported on a table 16 or the like.

Referring to FIGS. 6-9, and as an example, it is desired to cut a part 17 from plate 15. Part 17 has a vertical straight end edge 18, and a pair of straight side edges 19 which are perpendicular to edge 18. Edges 19 are also vertical through a portion of their extent, but merge through sharp transverse shoulders 20 into an inwardly beveled portion 21 which forms a contoured end 22 opposite edge 18.

In forming the basic outline of the cut described above, torch assembly 9 is moved in the longitudinal and/or transverse directions by the usual operation of motors 4 and 7. The mechanism for controlling the angle of cut as well as forming shoulder 20 will now be described.

Figure 3:
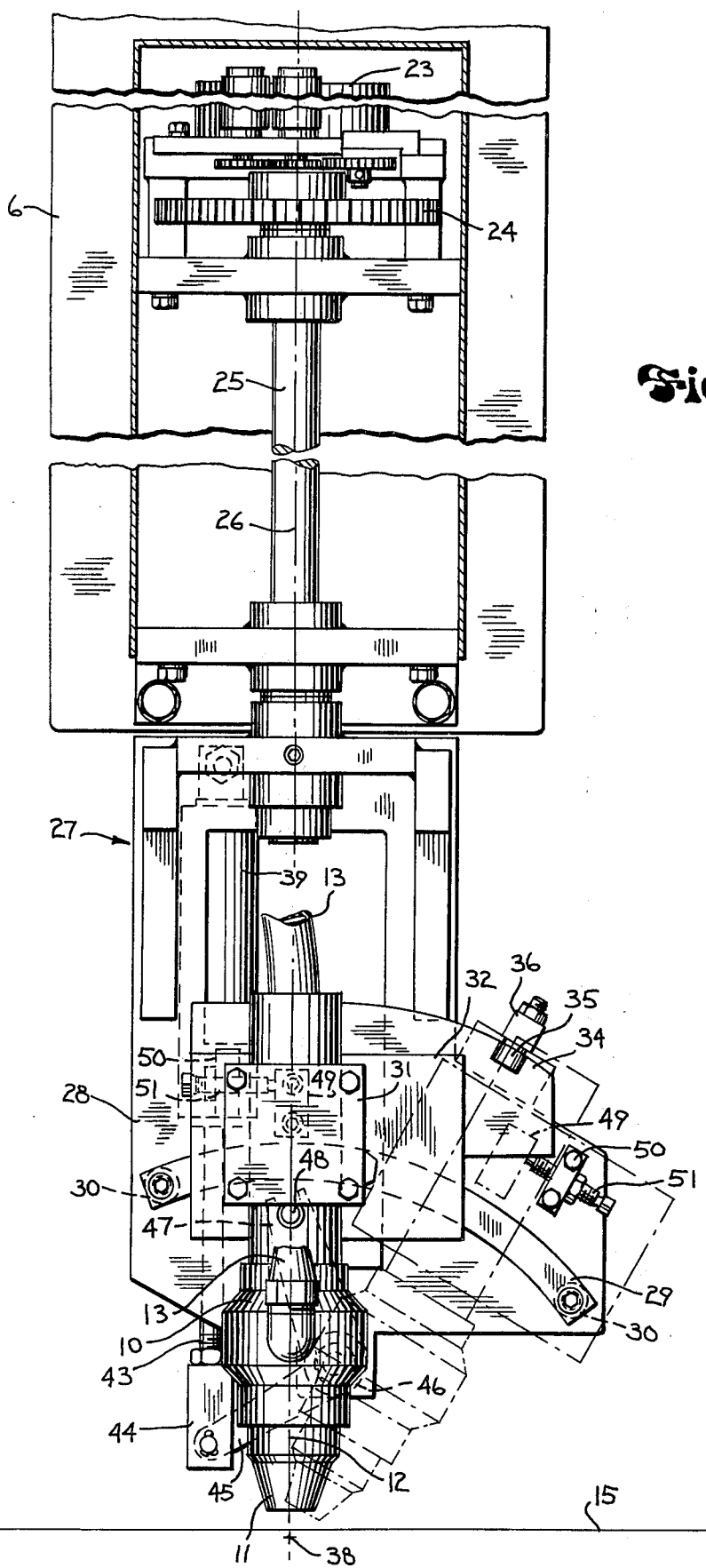
FIG. 3 is an enlarged front elevation of the entire assembly taken on line 3—3 of FIG. 4 with parts in section.
Figure 4:
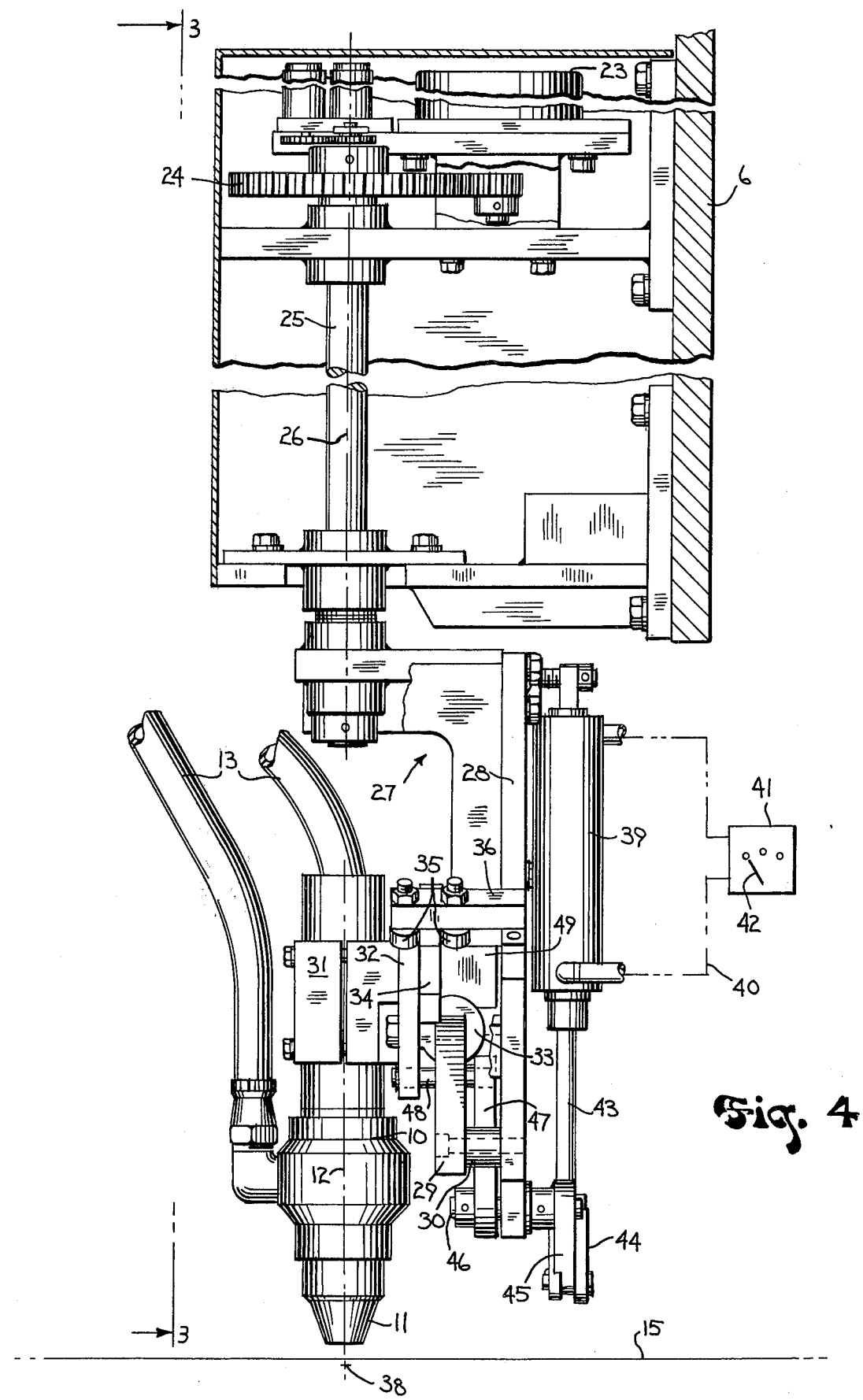
FIG. 4 is a side view of the assembly taken on line 4—4 of FIG. 1 with parts in section.
Figure 6:
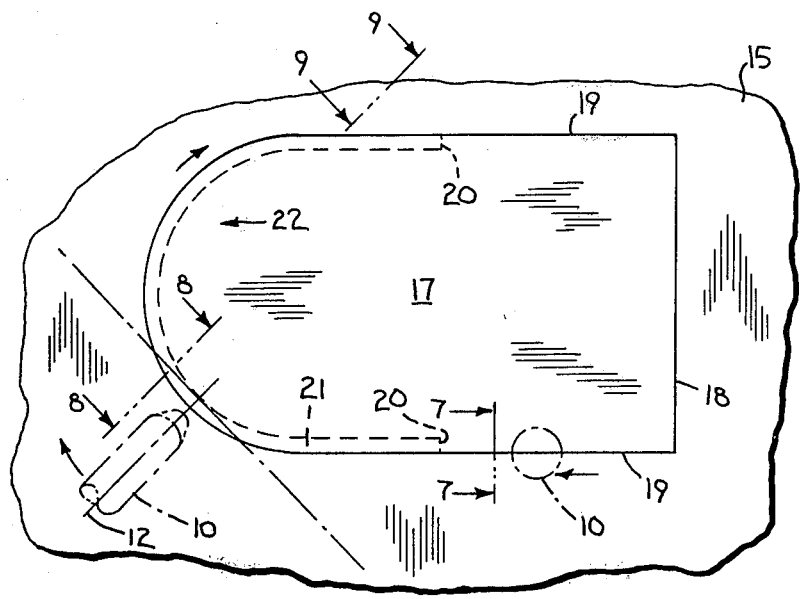
FIG. 6 is a schematic plan view of a workpiece showing formation of a gate valve.

Referring primarily to FIGS. 3 and 4, torch carriage 6 provides a framework within which is mounted a suitably actuated motor 23 which is connected through gearing 24 to a vertical shaft 25 defining an axis of rotation 26 which is co-axial with axis 12 when torch body 10 is vertical. The lower end of shaft 26 extends below the carriage housing and carries an inverted L-shaped support bracket 27. Bracket 27 includes a vertical portion offset from axes 12 and 26 and which forms a flat support member 28. See also FIG. 2.

For purposes of angular control of torch assembly 9, an arcuate cam-like sector 29 is mounted to the front face of support member 28 as by posts 30 which space sector 29 from member 28. See FIG. 4. Sector 29 is adapted to mount torch assembly 9, and for this purpose the upper portion of the assembly is mounted to a clamp 31 with the rear portion of the latter mounting a control plate 32. A pair of spaced cam followers 33 extend rearwardly from control plate 32 with follower 33 being generally circular and enveloping sector 29. For purposes of stabilizing torch assembly 9 so that, while it is effectively suspended from sector 29, it is held so that its axis 12 remains in a vertical plane generally parallel to support member 28, a position stabilizer plate 34 is mounted to the rear face of control plate 32. Plate 34 has an upper edge portion which is gripped between a pair of spaced support rollers 35 with the latter being mounted to an arm 36 which is secured to and extends forwardly from support member 28.

It is contemplated that torch body 10 be moved from one position to another on sector 29 in a manner so that the torch nozzle 11 is always pointed at the plane of plate 15 at all angular torch positions. For this purpose, the arc of sector 29 has a radius 37, the center 38 of which is disposed in the plane of planular workpiece 15, as best shown in FIG. 5.

The means for shifting torch body 10 comprises a fluid pressure cylinder 39 which may be of the pneumatic or hydraulic type and connected via lines 40 to a suitable actuating device which may be part of the machine controls but which, in this instance, is shown as a valve 41 having a suitable actuating handle 42. Cylinder 39 is attached to the rear face of support member 28 and has a movable ram 43 extending downwardly therefrom. The outer end of ram 43 has a block 44 thereon. One end of a lever 45 is pivotally mounted to the block, while the other end is fixedly mounted to one end of a rotatable shaft 46 which extends through support member 28. The other end of shaft 46 secures the inner end of a lever fork arm 47 (the outer fork end of which cradles a transverse pin 48) which is secured to and extends rearwardly from support member 28. Actuation of cylinder 39 causes ram 43 to move either up or down, so that fork arm 47 is caused to drive pin 48 and the associated connected torch body 10 arcuately about sector 29.

Stop means are provided on the assembly to adjustably position torch body 10 at one of a plurality of spaced fixed discrete locations on arcuate sector 29. For this purpose, a projection 49 is fixed to the rear of stabilizing plate 34 and moves arcuately with assembly 9. A pair of arcuately spaced stop members are mounted to support member 28 in the path of movement of projection 49, with the stop members shown as comprising a plate 50 secured to member 28 and an adjustable stop screw 51 threaded through the plate.

Figure 5:
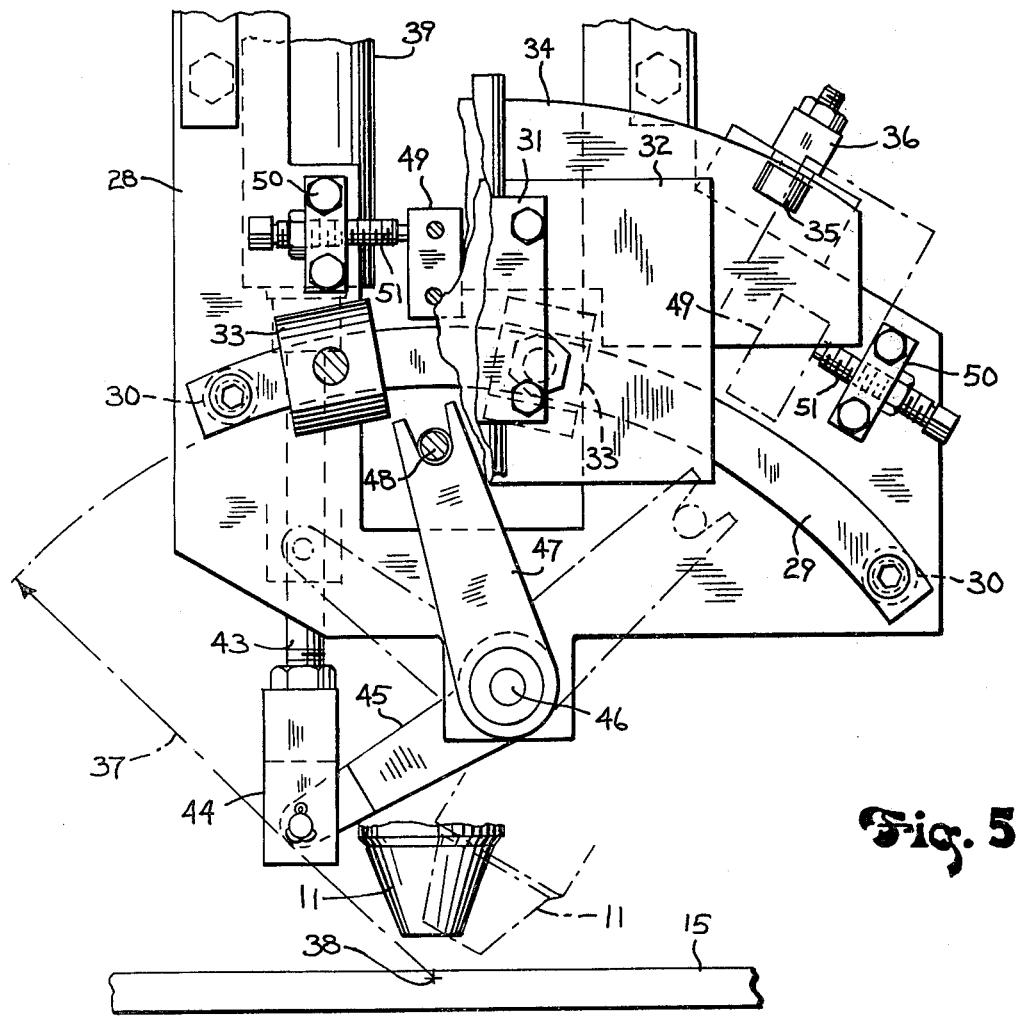
FIG. 5 is an enlarged fragmentary showing of the torch assembly showing torch movement.

In the embodiment disclosed herein, one stop member is disposed so that when projection 49 engages the respective upper screw 51, torch nozzle 11 will be generally vertical as shown in full lines in FIG. 5. The other stop member is disposed so that when projection 49 engages the other or lower screw 51, torch nozzle 11 will be disposed generally at 45° from the vertical as shown in phantom lines in FIG. 5.

Figure 7:
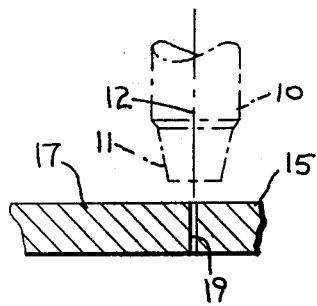
FIG. 7 is a section taken on line 7—7 of FIG. 6.
Figure 8:
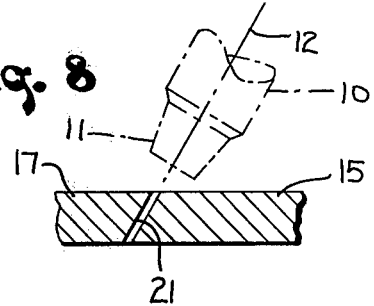
FIG. 8 is a section taken on line 8—8 of FIG. 6.

Turning now to FIGS. 6-9, it is desired to cut a gate valve or other part 17 in plate 15. With projection 49 in engagement with upper stop screw 51 so that torch nozzle 11 is vertical, the machine bridge and carriage are suitably actuated to cause the torch to cut edge 18 and to then proceed in the direction of the arrows to cut edge 19. As shown in FIG. 7, edge 19 will also be vertical. It is next desired to change the edge orientation from vertical to an angular bevel cut which is contoured, but with sharp shoulder 20 between them.

Figure 9:
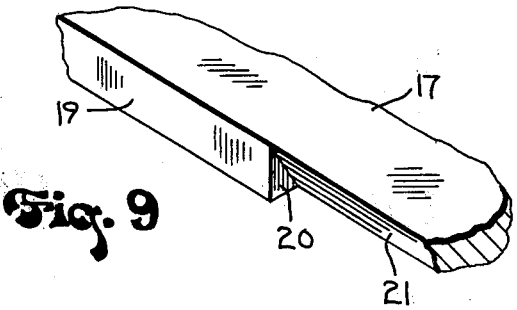
FIG. 9 is a fragmentary perspective view of the part showing the contour bevel and vertical cuts, taken on line 9—9 of FIG. 6.

The concept of the invention provides means to make a substantially instantaneous angle change, which creates the desired shoulder. This is accomplished by actuating ram 43 so that torch head 9 instantly moves from engagement with upper stop screw 51 to the lower stop screw, these screws setting the angular limits of torch movement. After the angle change, the torch traverses the contoured area, thus creating the bevel 21 while maintaining proper orientation because of the sector arrangement described previously. A quick return to a vertical cut is accomplished by shifting torch body 10 back to its original position. The changeover in angles, which is automatically sharp because of the structure of the device, is best shown in FIG. 9.

Figure 10:
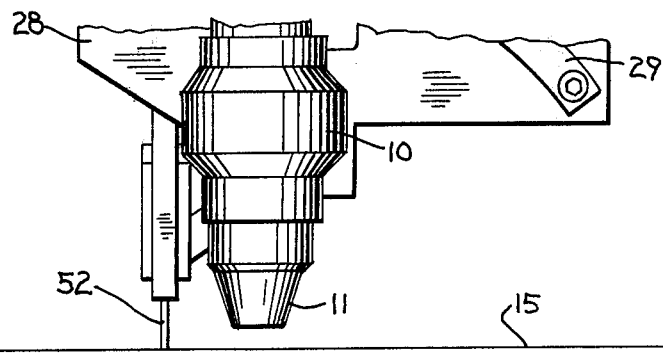
FIG. 10 is a fragmentary view showing the use of a height sensing probe.

Small workpieces 15 are usually completely flat, within tolerances. However, when very large workpieces are to be cut, there must be positional torch compensation for variations in the workpiece surface. As shown in FIG. 10, a suitable probe 52 may be attached to torch head 11 for sensing any irregularities in the workpiece surface. Probe 52 may be connected in any well-known way to a vertical adjustment mechanism (not shown) for the torch.

The concept of the invention provides a substantially improved arrangement for providing a substantially instant change in position of a cutting torch between a plurality of cutting angles. In the present embodiment, one cutting angle position is vertical and the other is other than vertical for providing for only a partial bevel cut. However, both cutting angle positions could be other than vertical to provide two joined bevel cuts of different angularity.

While the present disclosure has been directed primarily to flame and plasma type torches, it is contemplated that the invention may embrace other types of gas or fluid material severing devices, including lasers and water jets.

Various modes of carrying out the invention are contemplated as being within the scope of the following claims particularly pointing out and distinctly claiming the subject matter which is regarded as the invention.

We claim:

1. In a device for progressively cutting a flat workpiece, the combination comprising:

(a) a frame,
(b) an arcuate sector mounted on said frame,
(c) a cutting torch connected to said sector and movable arcuately relative to said frame,
(d) a plurality of arcuately spaced stop members disposed on said frame and in the path of arcuate movement of said torch and engageable thereby, said stop members defining a plurality of spaced fixed descrete arcuate positions of said torch with said positions being translatable into the respective angles of cut on the workpiece,
(e) and fluid pressure actuated means to substantially instantaneously move said torch arcuately between said spaced discrete positions to provide a resultant instant change of cutting angle on the workpiece as said torch cuts the workpiece.

2. The device of claim 1 which includes means suspending said torch from said sector.

3. The device of claim 2 wherein said torch suspending means comprises:
(a) a control plate mounted on said torch,
(b) and a follower mounted on said control plate and disposed in engagement with said sector.

4. The device of claim 3 which includes:
(a) a stabilizing plate mounted to said control plate,
(b) and roller means connected to said frame and engaging said stabilizing plate to hold the axis of said torch in a vertical plane.

5. The device of claim 4 which includes a projection disposed on said stabilizing plate and with said projection adapted to selectively engage said stop members.

6. The device of claim 3 or 4 wherein said fluid pressure actuated means comprises:
(a) a fluid cylinder having a shiftable ram,
(b) a pin extending from said control plate,
(c) and lever means connecting said ram and said pin to move the latter upon actuation of said ram.

7. In a device for progressively cutting a flat workpiece, the combination comprising:
(a) a frame,
(b) an arcuate sector mounted on said frame and with said sector having a radius, the center of which is disposed in the plane of the workpiece,
(c) a cutting torch,
(d) means suspending said cutting torch from said sector so that said torch is arcuately movable relative to said frame,
(e) means disposed on said frame and defining a plurality of spaced fixed discrete arcuate positions of said torch and with said positions being translatable into the respective angles of cut on the workpiece,
(f) said last-named means (e) comprising a plurality of arcuately spaced stop members disposed in the path of arcuate movement of said torch and engageable thereby,
(g) said stop members being adjustable to selectively vary the angular engaged stop positions of said torch and the resultant angles of cut,
(h) and means to substantially instantaneously move said torch arcuately between said spaced discrete positions to provide a resultant instant change of cutting angle on the workpiece as said torch cuts the workpiece,
(i) said last-named means (h) comprising: a fluid cylinder having a shiftable ram connected to said torch, and means to shift said ram substantially instantaneously.

* * * * *